US007971189B2

(12) United States Patent
Drake

(10) Patent No.: US 7,971,189 B2
(45) Date of Patent: *Jun. 28, 2011

(54) AUTOMATED INTERACTION DIAGRAM GENERATION USING SOURCE CODE BREAKPOINTS

(75) Inventor: Daniel Reed Drake, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 363 days.

This patent is subject to a terminal disclaimer.

(21) Appl. No.: 12/340,651

(22) Filed: Dec. 20, 2008

(65) Prior Publication Data

US 2009/0106598 A1    Apr. 23, 2009

Related U.S. Application Data

(63) Continuation of application No. 11/085,324, filed on Mar. 21, 2005, now Pat. No. 7,484,203.

(51) Int. Cl.
*G06F 9/44* (2006.01)
(52) U.S. Cl. .................................. 717/126
(58) Field of Classification Search .............. 717/126
See application file for complete search history.

(56) References Cited

U.S. PATENT DOCUMENTS

| 5,732,277 | A | 3/1998 | Kodosky et al. | 395/800 |
| 6,438,742 | B1 | 8/2002 | McCann et al. | 717/109 |
| 6,792,595 | B1 | 9/2004 | Soristenau et al. | 717/110 |
| 2002/0170042 | A1 | 11/2002 | Do et al. | 717/143 |
| 2003/0106045 | A1* | 6/2003 | Arnold et al. | 717/129 |
| 2006/0064677 | A1* | 3/2006 | Bickson et al. | 717/124 |

FOREIGN PATENT DOCUMENTS

| JP | 63100504 | 5/1998 |
| JP | 2004110378 | 4/2004 |

OTHER PUBLICATIONS

Strunk et al., "Tool Support for Testing and Documenting Framework-Based Software," Aug. 1999, IEEE.

* cited by examiner

*Primary Examiner* — Philip Wang
*Assistant Examiner* — Junchun Wu
(74) *Attorney, Agent, or Firm* — VanLeeuwen & Van Leeuwen

(57) ABSTRACT

An automated interaction diagram generation using source code breakpoints is presented. A user sets diagram breakpoints at locations in source code using an integrated development environment (IDE) that includes a diagram generation manager. The user sets the breakpoints at locations where the user wishes to capture the interaction between objects on an interaction diagram. The IDE executes the code and the diagram generation manager collects breakpoint data corresponding to the breakpoints. Once the source code finishes executing, the diagram generation manager formats the breakpoint data and generates an interaction diagram based upon the formatted breakpoint data. The user may instruct the diagram generation manager to add or remove detail from the interaction diagram by adjusting breakpoint attributes and/or adding/deleting breakpoints.

11 Claims, 8 Drawing Sheets

AUTOMATED INTERACTION DIAGRAM GENERATION USING SOURCE CODE BREAKPOINTS

CROSS-REFERENCE TO RELATED APPLICATIONS

This application is a continuation application of co-pending U.S. Non-Provisional patent application Ser. No. 11/085,324, entitled "Automated Interaction Diagram Generation Using Source Code Breakpoints," filed on Mar. 21, 2005.

BACKGROUND OF THE INVENTION

1. Technical Field

The present invention relates in general to a system and method for automated interaction diagram generation using source code breakpoints. More particularly, the present invention relates to a system and method for using an integrated development environment to set breakpoints in source code, and automatically generate an interaction diagram based upon collected breakpoint data that corresponds to the breakpoints.

2. Description of the Related Art

As the strategic value of software increases for many companies, the industry looks for techniques to automate the production of software and to improve quality, reduce cost, and decrease time-to-market. The industry has developed a Unified Modeling Language (UML) to address these needs.

The UML is a standard language for specifying, visualizing, constructing, and documenting the artifacts of software systems. The UML uses mostly graphical notations to express the design of software projects, and has become an important part of developing object oriented software. Two popular UML interaction diagrams are sequence diagrams and collaboration diagrams. A sequence diagram displays the time sequence of the objects participating in an interaction (e.g., a method call). This consists of a vertical dimension (time) and a horizontal dimension (different objects). A collaboration diagram displays an interaction that is organized around the objects and their links to each another.

A challenge found is that the process of selecting and entering information that is required to generate interaction diagrams is time consuming and may become unwieldy for large projects. Furthermore, data entry errors or updated code paths require a user to delete and reenter the information in order to regenerate the interaction diagram. The tedium of entering and reentering data is a disincentive for developers to utilize diagrammatic representations of execution flow from existing source code or from prototypes.

What is needed, therefore, is a system and method for a user to automatically generate interaction diagrams from source code.

SUMMARY

It has been discovered that the aforementioned challenges are resolved by using an integrated development environment for setting breakpoints in source code, and automatically generating an interaction diagram based upon breakpoint data that corresponds to the diagram breakpoints. A user sets diagram breakpoints at locations in source code using an integrated development environment (IDE) that includes a diagram generation manager. The IDE executes the code and the diagram generation manager collects breakpoint data corresponding to the breakpoints. Once the source code finishes executing, the diagram generation manager generates an interaction diagram based upon the collected breakpoint data.

A user wishes to generate an interaction diagram, such as a sequence diagram or a collaboration diagram, from source code. The user instructs the IDE to retrieve the source code and display the source code in a source code window. The source code window includes an area that displays the source code as well as an area for the user to set breakpoints at particular source code locations.

The user views the source code, and sets breakpoints at particular locations in the source code using the IDE. The IDE includes a diagram generation manager, which manages breakpoint tracking, stores breakpoint data, and generates an interaction diagram from the breakpoint data. The diagram generation manager receives the breakpoint locations from the user, and stores the breakpoint locations in a storage area.

The user may configure default breakpoint attributes for the breakpoints or customize breakpoint attributes for particular breakpoints. For example, the user may configure default attributes such that the method name corresponding to each breakpoint is displayed on an interaction diagram. Using this example, the user may also customize breakpoint attributes such that method parameter values are also displayed on the interaction diagram for particular breakpoints.

Once the user sets the breakpoints in the source code, the user instructs the IDE to execute the source code in an execution environment. As the source code executes, the diagram generation manager monitors the code execution to detect when the code reaches a breakpoint. When the code reaches a breakpoint, the diagram generation manager collects breakpoint data that corresponds to the breakpoint and stores the breakpoint data in a storage area. The breakpoint data may include a calling object name, a called object name, a method name, method parameters, and a method return value.

In one embodiment, when the code reaches a breakpoint, the user is able to select various options that are common in debugger applications, such as "step over," "step into," "show variables and values," etc. In this embodiment, the user may optionally choose to step into, step over, or show variable values as required each time the code execution pauses at a break point.

Once the source code finishes executing, the diagram generation manager retrieves the breakpoint data and formats the breakpoint data for drawing an interaction diagram based upon breakpoint attribute settings. In turn, the diagram generation manager uses the formatted data to generate an interaction diagram, and displays the interaction diagram in a diagram window.

The user may view the interaction diagram and decide to add/delete breakpoint locations. If so, the user adds/deletes breakpoint locations using the source code window. In turn, the IDE re-executes the source code and the diagram generation manager stores new breakpoint data for the breakpoint locations. The diagram generation manager then generates a new interaction diagram using the new breakpoint data. The user may continue to adjust breakpoint locations and breakpoint attributes until the user is satisfied with the resulting interaction diagram.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
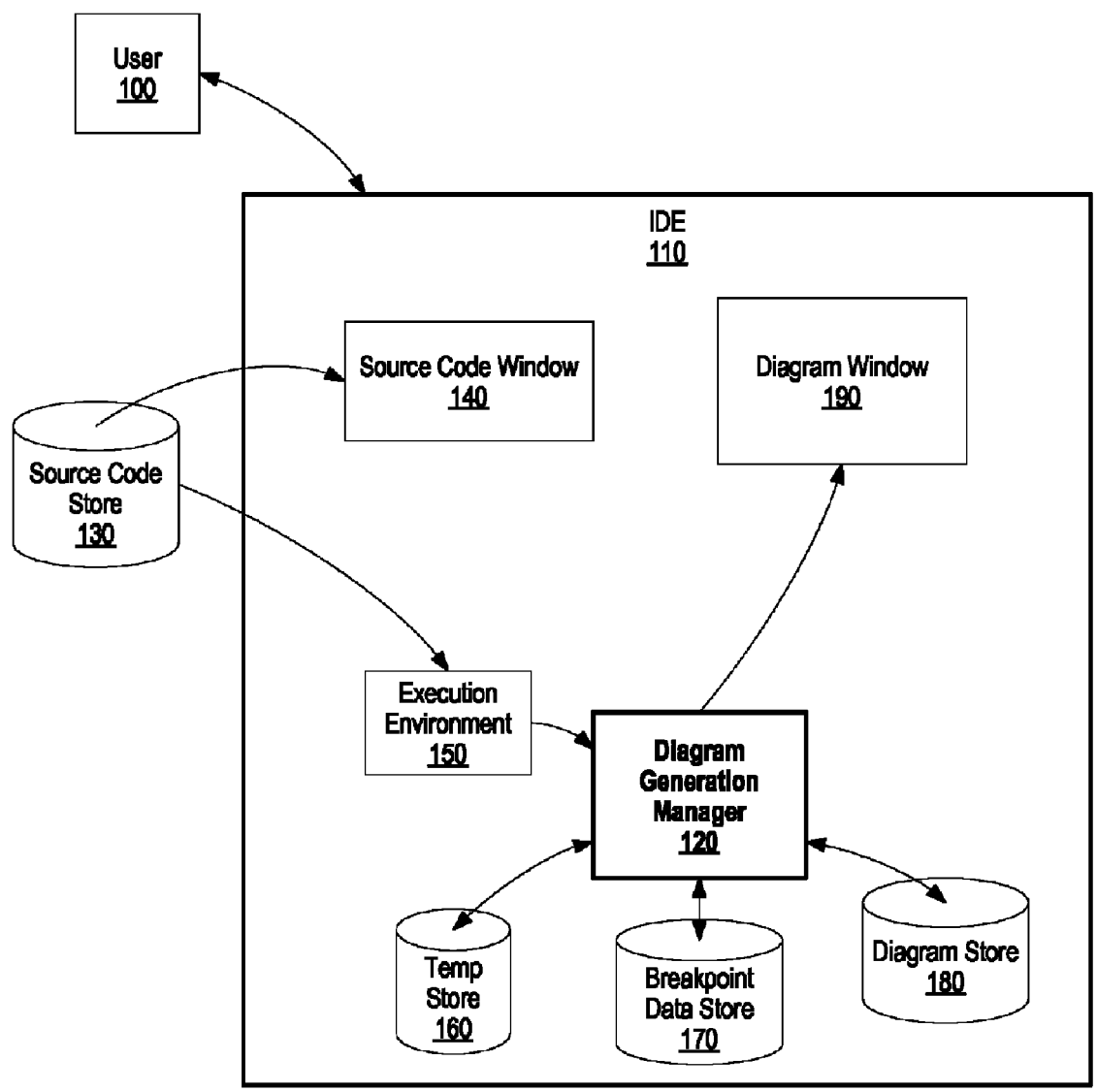
FIG. 1 is a diagram showing a diagram generation manager generating an interaction diagram based upon user-specific breakpoint locations.

FIG. 1 is a diagram showing a diagram generation manager generating an interaction diagram based upon user-specific breakpoint locations. User 100 wishes to generate an interaction diagram, such as a sequence diagram or a collaboration diagram, from source code that is stored in source code store 130. Source code store 130 may be stored on a nonvolatile storage area, such as a computer hard drive. User 100 instructs integrated development environment (IDE) 110 to retrieve the source code and display the source code in source code window 140. Source code window 140 includes an area that displays the source code as well as an area for user 100 to set breakpoints at particular locations (see FIG. 2A and corresponding text for further details regarding source code window properties).

User 100 views the source code data, and sets breakpoints at particular locations within the source code using IDE 110. IDE 110 includes diagram generation manager 120, which manages breakpoint tracking, stores breakpoint data, and generates the interaction diagram from the breakpoint data. Diagram generation manager 120 receives the breakpoints from user 100, and stores the source code locations corresponding to the breakpoints in temporary store 160 (see FIG. 5 and corresponding text for further details regarding breakpoint storing steps). Temporary store 160 may be stored on a nonvolatile storage area, such as a computer hard drive.

User 100 may configure default breakpoint attributes for the breakpoints or customize breakpoint attributes for particular breakpoints. For example, user 100 may configure default attributes such that the method name corresponding to each breakpoint is displayed on an interaction diagram that corresponds to each breakpoint. Using this example, the user may also customize breakpoint attributes for particular breakpoints such that method parameter values are also displayed on the interaction diagram (see FIGS. 2A, 2B, 4, 5, and corresponding text for further details regarding breakpoint attributes).

Once user 100 sets the breakpoints in the source code, user 100 instructs IDE 110 to execute the source code using execution environment 150. As execution environment 150 executes the code, diagram generation manager 120 monitors the code execution to detect when the code execution reaches a breakpoint. When the code execution reaches a breakpoint, diagram generation manager 120 collects breakpoint data that corresponds to the breakpoint and stores the breakpoint data in breakpoint data store 170. The breakpoint data corresponds to the source code location of the breakpoint and may include a calling object name, a called object name, a method name, method parameters, and a method return value. Breakpoint data store 170 may be stored on a nonvolatile storage area, such as a computer hard drive.

The stored breakpoint data may include more information than the corresponding breakpoint attributes that were set by user 100. Therefore, if user 100 views the interaction diagram and wants to include more information regarding a particular breakpoint, the source code does not have to be re-executed in order to collect more breakpoint data (see FIG. 7 and corresponding text for further details regarding interaction diagram formatting).

Once the source code finishes executing, diagram generation manager 120 retrieves the breakpoint data that is stored in breakpoint data store 170, and formats the breakpoint data for drawing an interaction diagram based upon breakpoint attribute settings. Diagram generation manager 120 stores the formatted data in diagram store 180 (see FIG. 7 and corresponding text for further details regarding data formatting). Diagram store 180 may be stored on a nonvolatile storage area, such as a computer hard drive.

Diagram generation manager 120 uses the formatted data to generate an interaction diagram and displays the interaction diagram in diagram window 190. User 100 may view the interaction diagram and decide to add/delete breakpoint locations. If so, user 100 adds/deletes breakpoint locations using source code window 140 and, in turn, the source code is re-executed and diagram generation manager 120 stores new breakpoint data for each of the breakpoint locations. Diagram generation manager 120 then generates a new interaction diagram using the new breakpoint data. User 100 may continue to adjust breakpoint locations and breakpoint attributes until user 100 is satisfied with the resulting interaction diagram (see FIG. 3B and corresponding text for further details regarding interaction diagrams).

Figure 2A:
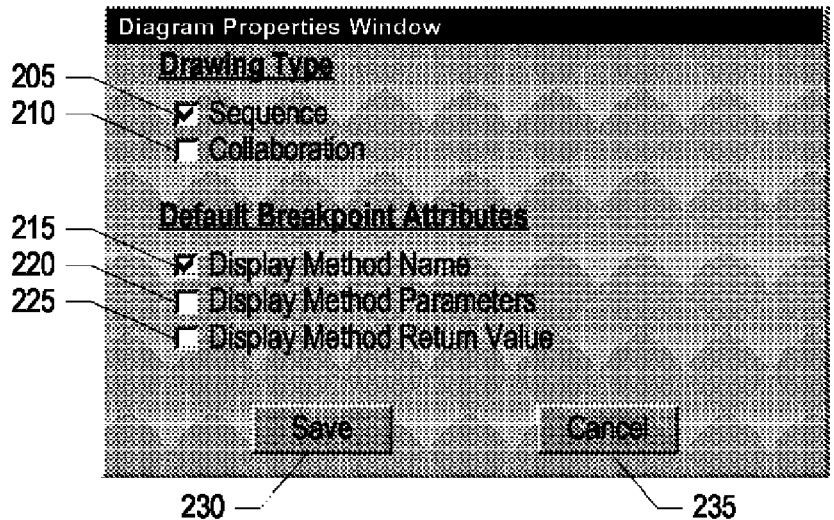
FIG. 2A is a user interface window that allows a user to set an interaction diagram type and default breakpoint attributes.

FIG. 2A is a user interface window that allows a user to set an interaction diagram type and default breakpoint attributes. A user wishes to generate an interaction diagram using source code. The user's integrated development environment (IDE) includes a diagram generation manager that displays window 200 in order for the user to specify which type of interaction diagram to draw and the breakpoint attributes to be displayed on the interaction diagram.

Window 200 includes check boxes 205 and 210 that correspond to a sequence interaction diagram and a collaboration interaction diagram, respectively. When the user wishes the diagram generation manager to generate a sequence interaction diagram, the user selects check box 205. When the user wishes the diagram generation manager to generate a collaboration diagram, the user selects check box 210. In one embodiment, the user may select both check boxes 205 and 210, in which case the diagram generation manager generates both a sequence interaction diagram and a collaboration diagram. As one skilled in the art can appreciate, other interaction diagram types may be generated other than sequence and collaboration diagrams.

Window 200 also includes check boxes 215, 220, and 225, which correspond to default breakpoint attributes. The diagram generation manager uses the default breakpoint attributes to determine what to display on an interaction diagram for each breakpoint. For example, if a user selected checkbox 215 and did not select check boxes 220 and 225, such as what is shown in FIG. 2A's example, the diagram generation manager displays a corresponding method name on an interaction diagram for each breakpoint, but does not display method parameters or a method return value.

When the user is finished selecting a drawing type and default breakpoint attributes, the user selects command button 230 to save the configuration. If the user does not wish to save the configuration, the user selects command button 235, which closes window 200 and the user's changes are not saved. If the user wishes to view more breakpoint attributes for particular breakpoints, the user may customize breakpoint attributes for individual breakpoints (see FIG. 2B and corresponding text for further details regarding breakpoint attribute customization).

Figure 2B:
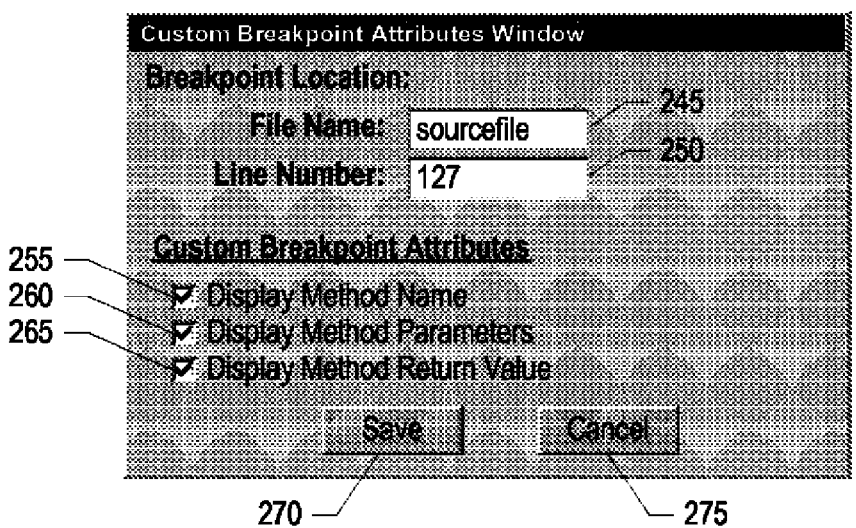
FIG. 2B is a user interface window that allows a user to set custom breakpoint attributes for a particular breakpoint.

FIG. 2B is a user interface window that allows a user to set custom breakpoint attributes for a particular breakpoint. When a user sets a breakpoint, the user may inform the diagram generation manager that the user wishes to customize breakpoint attributes for the particular breakpoint. In turn, the diagram generation manager displays window 240 for the user to do so (see FIG. 3A and corresponding text for further details regarding breakpoint setting).

Window 240 includes text boxes 245 and 250. The diagram generation manager displays the source code file name in text box 245 and the corresponding breakpoint location in text box 250. In one embodiment, the user may edit text box 250 to include other breakpoint locations. For example, if the user wished to customize breakpoint attributes for breakpoints that are located at lines 127, 147, and 157, the user may enter "127, 147, 157" into text box 250 in order to customize breakpoint attributes for each of the breakpoint locations.

The user selects check boxes 255, 260, and/or 265 to customize breakpoint attributes for the breakpoint that corresponds to the location shown in text box 250. The example shown in FIG. 2B shows that the user wishes to view the method name, the method parameters, and the method return value on an interaction diagram for the breakpoint that is located on line number 127 in the file "sourcefile."

When the user is finished customizing breakpoint attributes, the user selects command button 270 to save the configuration. If the user does not wish to save the configuration, the user selects command button 275, which closes window 240 and the user's changes are not saved.

Figure 3A:
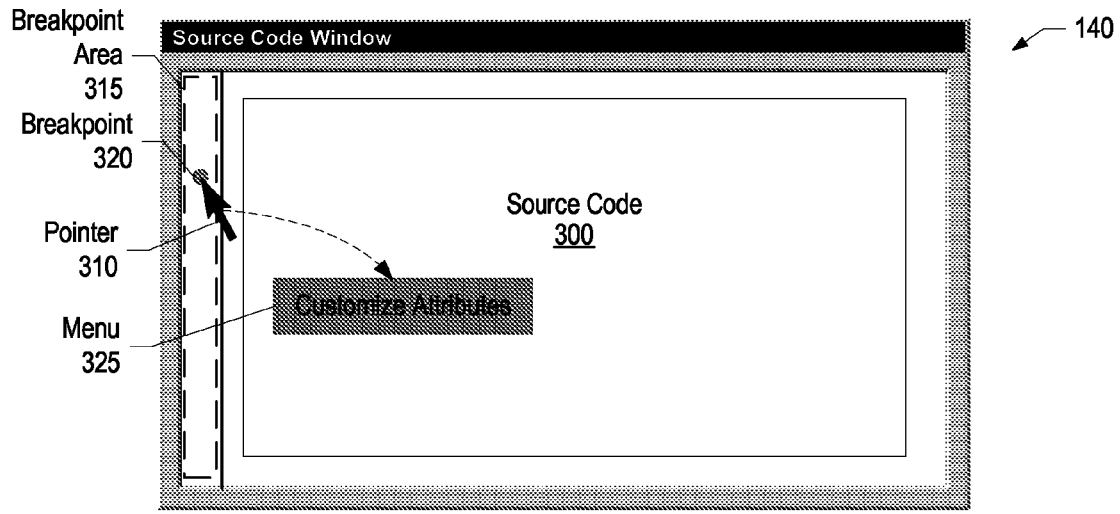
FIG. 3A is a user interface window that allows a user to enter breakpoints at particular source code locations for generating an interaction diagram.

FIG. 3A is a user interface window that allows a user to enter breakpoints at particular source code locations for generating an interaction diagram. A diagram generation manager retrieves source code 300 and displays the source code in source code window 140. Source code window 140 is the same as that shown in FIG. 1.

The user views source code 300, and positions pointer 310 in breakpoint area 315 at a location that corresponds to a particular line of code that is included in source code 300. The user performs a user action, which sets and displays breakpoint 320.

The user may wish to customize attributes for breakpoint 320. If so, the user performs a user action (e.g. right mouse click) over breakpoint 320 and, in turn, menu 325 is displayed which includes a selection for the user to customize breakpoint attributes. The user selects "Customize Attributes" and, in turn, a customize breakpoint attribute window is displayed for the user to customize breakpoint attributes for breakpoint 320 (see FIG. 2B and corresponding text for further details regarding breakpoint attribute customization).

Figure 3B:
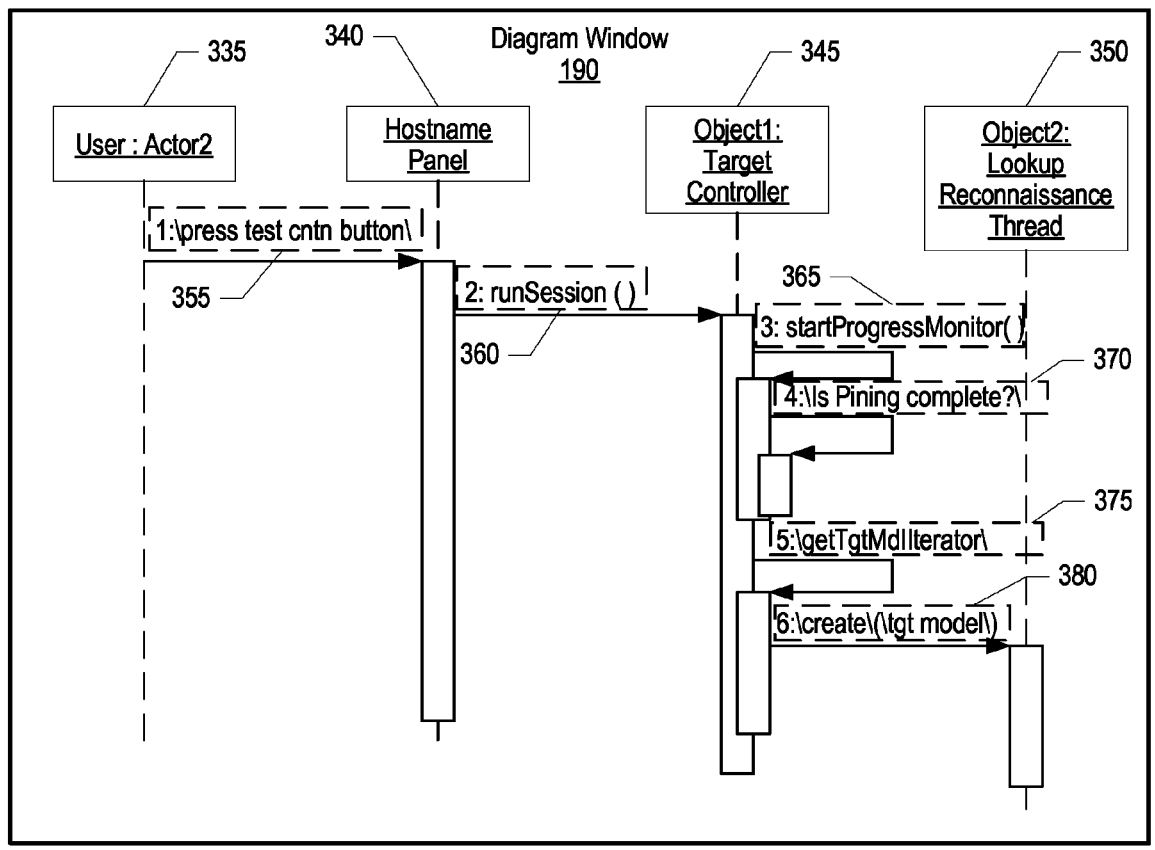
FIG. 3B is an interaction diagram that a diagram generation manager generates based upon user-specified breakpoints and breakpoint attributes.

FIG. 3B is an interaction diagram that a diagram generation manager generates based upon user-specified breakpoints and breakpoint attributes. Diagram window 190 includes a sequence diagram that corresponds to particular source code. The user set breakpoints at particular source code locations and, in turn, the diagram generation manager generated the interaction diagram shown in diagram window 190.

The interaction diagram abides by the unified modeling language (UML) format for sequence diagrams, which displays the time sequence of objects based upon the source code execution. The interaction diagram includes a vertical dimension and a horizontal dimension. The vertical dimension includes the time sequence of methods that correspond to the breakpoints, such as methods 355-380. The horizontal dimension includes the different objects that call or are called by the methods, such as objects 335-350. As one skilled in the art can appreciate, other interaction diagram types may be generated using the invention described herein.

Figure 4:
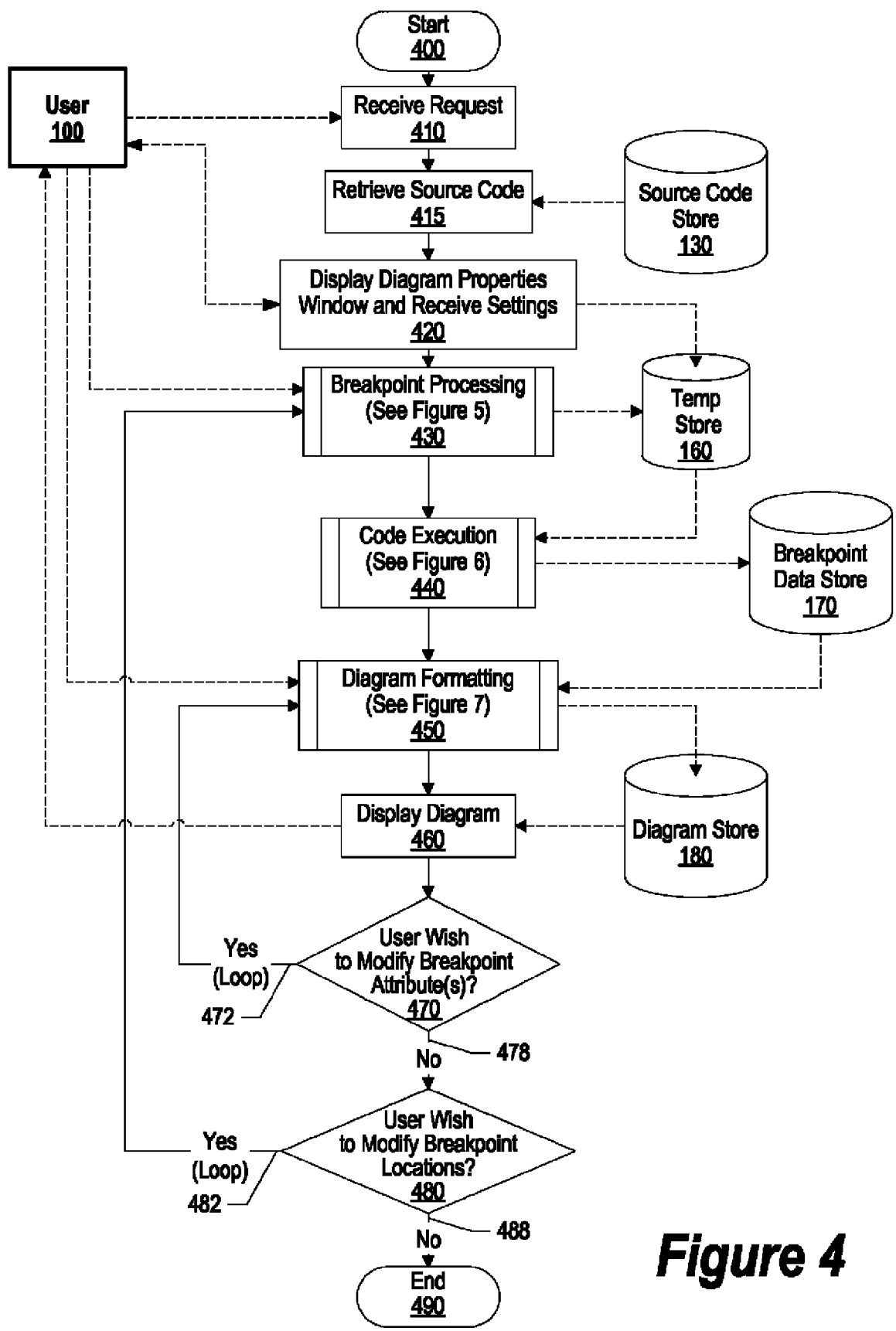
FIG. 4 is a high-level flowchart showing steps taken in setting breakpoints and generating an interaction diagram based upon the breakpoints.

FIG. 4 is a high-level flowchart showing steps taken in setting breakpoints and generating an interaction diagram based upon the breakpoints. A user sets breakpoints at source code locations using an integrated development environment (IDE) that includes a diagram generation manager. When the user is finished setting breakpoints, the IDE executes the code and the diagram generation manager generates an interaction diagram based upon breakpoint data that is collected when the source code reaches the breakpoints during execution.

Processing commences at 400, whereupon processing receives a request from user 100 (step 410). User 100 is the same as that shown in FIG. 1. At step 415, processing retrieves source code from source code store 130 that corresponds to user 100's request. Processing displays a diagram properties window in order for user 100 to select an interaction diagram type (e.g., sequence or collaboration) and default breakpoint attributes, such as a method name, parameters, and a return value (see FIG. 2A and corresponding text for further details regarding the diagram properties window). Processing receives user 100's settings, and stores the settings in temporary store 160 (step 420). Temporary store 160 is the same as that shown in FIG. 1.

Figure 5:
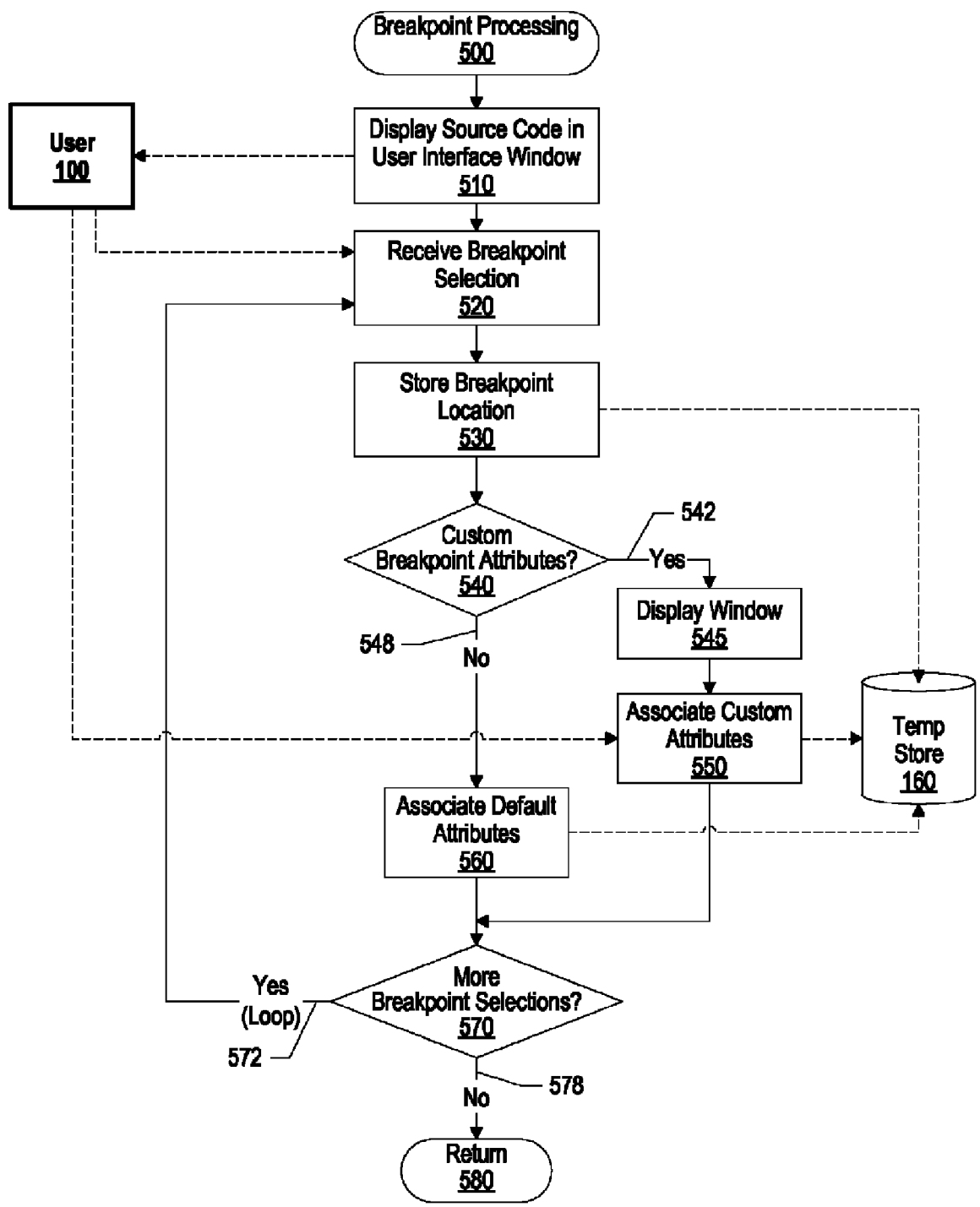
FIG. 5 is a flowchart showing steps taken in receiving breakpoints from a user and storing the breakpoint locations and their corresponding attributes.

Processing displays the source code in a source code window and receives breakpoints from user 100, which are stored in temporary store 160 (pre-defined process block 430, see FIG. 5 and corresponding text for further details). Once user 100 has set the breakpoints in the source code, processing executes the code and stores breakpoint data in breakpoint data store 170 (pre-defined process block 440, see FIG. 6 and corresponding text for further details).

Figure 7:
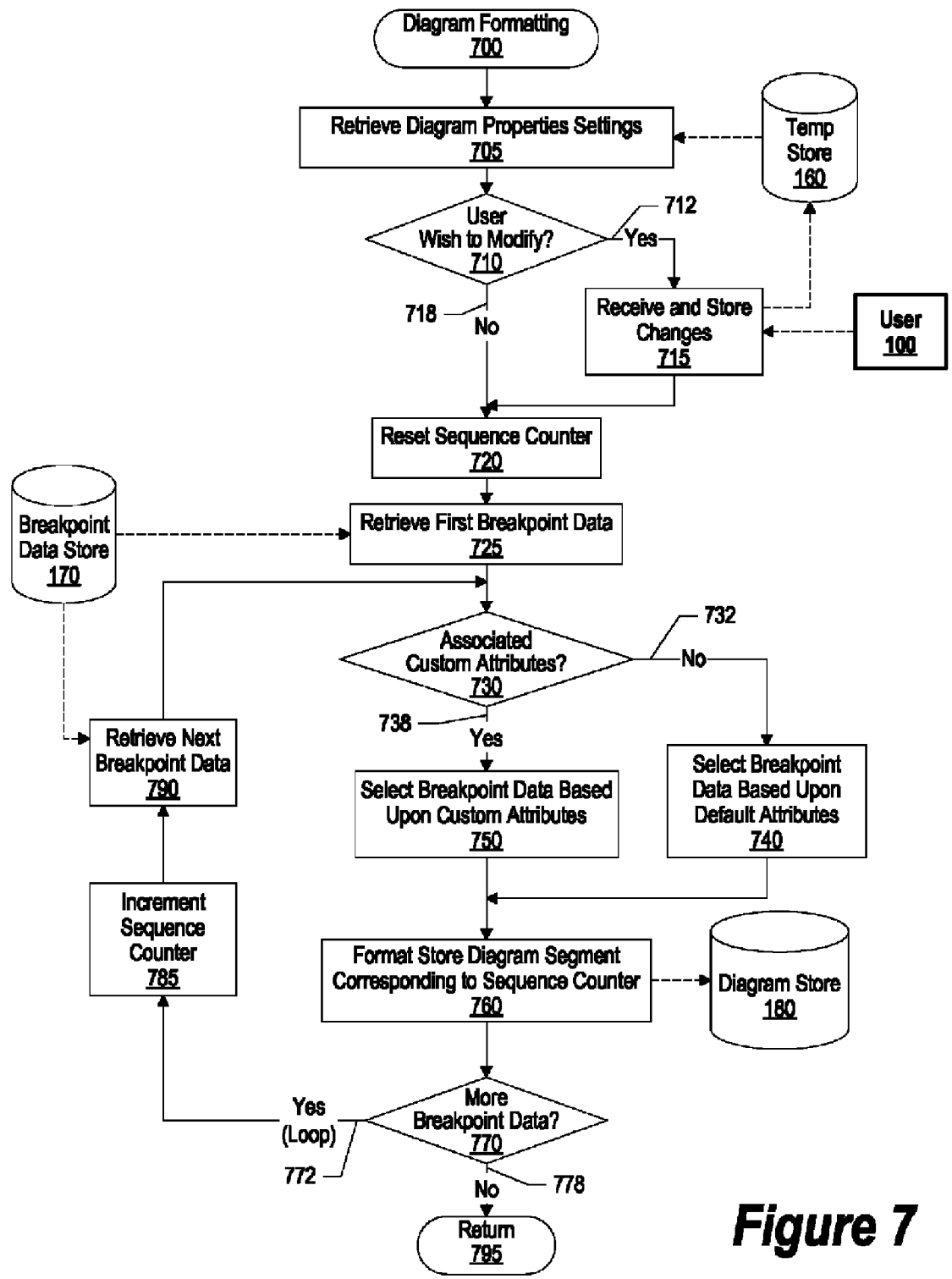
FIG. 7 is a flowchart showing steps taken in formatting breakpoint data for use in the generation of an interaction diagram.

After the code is finished executing, processing formats the breakpoint data for drawing an interaction diagram based upon breakpoint attribute settings, and stores the formatted data in diagram store 180 (pre-defined process block 450, see FIG. 7 and corresponding text for further details). For example, the breakpoint data may be stored in a table and the diagram generation manager uses a drawing tool that requires the data to be in a different format. In this example, the diagram generation manager formats the tabular data into the correct format for drawing. Diagram store 180 is the same as that shown in FIG. 1.

Processing retrieves the formatted data from diagram store 180, and displays an interaction diagram to user 100 using the formatted data at step 460. The type of interaction diagram corresponds to user 100's diagram properties window selection in step 420 above and includes a diagram segment for each of the breakpoints. The diagram segments include breakpoint attributes, such as a method name, method parameters, and/or return values.

User 100 views the interaction diagram, and a determination is made as to whether user 100 wishes to modify breakpoint attributes for one or more of the breakpoints (decision 470). For example, user 100 may wish to view method parameters and the method return value that correspond to one of the breakpoints. If user 100 wishes to modify breakpoint attributes, decision 470 branches to "Yes" branch 472 which loops back to receive breakpoint attribute changes and re-generate the interaction diagram. This looping continues until user 100 does not wish to modify breakpoint attributes, in which case decision 470 branches to "No" branch 478.

A determination is made as to whether user 100 wishes to add/delete breakpoint locations (decision 480). For example, user 100 may have breakpoints set at lines 140, 150, and 160, and user 100 wishes to add a breakpoint at line 155. If user 100 wishes to add/delete breakpoints, decision 480 branches to "Yes" branch 482 which loops back to receive breakpoints, re-execute the source code, and generate a new interaction diagram using newly collected breakpoint data. This looping continues until user 100 does not wish to add or delete breakpoints, at which point decision 480 branches to "No" branch 488 whereupon processing ends at 490.

FIG. 5 is a flowchart showing steps taken in receiving breakpoints from a user and storing the breakpoint locations and their corresponding attributes. User 100 requested an integrated development environment (IDE) tool to retrieve source code and display the source code such that user 100 may set breakpoints in the source code (see FIG. 4 and corresponding text for further details regarding user requests).

Processing commences at 500, whereupon processing displays the source code in a source code window for user 100 to view (step 510). The source code window includes an area to display the source code as well as an area for user 100 to set breakpoints (see FIG. 2A and corresponding text for further details regarding source code window properties).

At step 520, processing receives a breakpoint selection from user 100. Processing stores the breakpoint location (e.g., the source code location) in temporary store 160 at step 530. The breakpoint location information may be stored in a standard format, such as in a table. Temporary store 160 is the same as that shown in FIG. 1.

A determination is made as to whether user 100 wishes to assign customized attributes the breakpoint selection (decision 540). For example, user 100 may wish to view a method return value for the particular breakpoint selection. If user 100 wishes to associate customized breakpoint attributes to the breakpoint selection, decision 540 branches to "Yes" branch 542 whereupon processing displays a customized breakpoint attribute window at step 545 (see FIG. 2B and corresponding text for further details regarding customized breakpoint attribute windows). Processing receives user 100's customized breakpoint attributes and stores the attributes with the breakpoint location in temporary store 160 (step 550).

On the other hand, if user 100 does not wish to assign customized breakpoint attributes to the breakpoint selection, decision 540 branches to "No" branch 548 whereupon processing stores default breakpoint attributes with the breakpoint selection in temporary store 160 (step 560).

A determination is made as to whether user 100 wishes to set more breakpoints (decision 570). If user 100 wishes to set more breakpoints, decision 570 branches to "Yes" branch 572 which loops back to receive and process more breakpoints from user 100. This looping continues until user 100 is finished setting breakpoints, at which point decision 570 branches to "No" branch 578 whereupon processing returns at 580.

Figure 6:
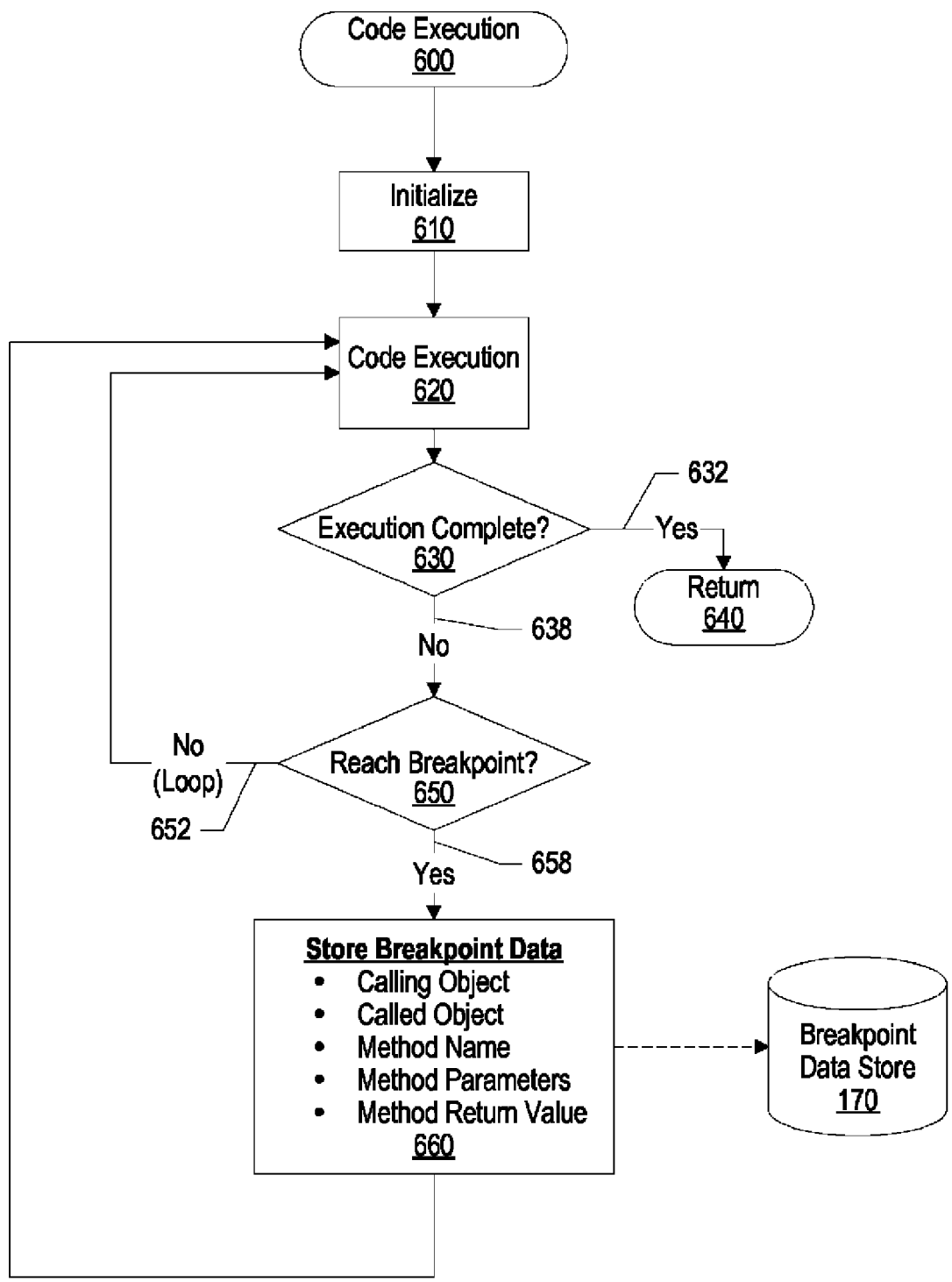
FIG. 6 is a flowchart showing steps taken in executing code and storing breakpoint data when the code reaches a breakpoint.

FIG. 6 is a flowchart showing steps taken in executing code and storing breakpoint data when the code reaches a breakpoint. A user set breakpoints at particular source code locations. While the source code executes and reaches a breakpoint, a diagram generation manager stores breakpoint data corresponding to the breakpoint.

Processing commences at 600, whereupon processing initializes and loads the source code into an execution environment at step 610. At step 620, processing begins to execute the source code. Processing monitors the source code execution, and a determination is made as to whether the source code is finished executing (decision 630). If the source code is finished executing, decision 630 branches to "Yes" branch 632 whereupon processing returns at 640. On the other hand, if the source code is still executing, decision 630 branches to "No" branch 638.

A determination is made as to whether a breakpoint has been reached in the source code (decision 650). If a breakpoint has not been reached, decision 650 branches to "No" branch 652 which loops back to monitor the source code execution. This looping continues until the source code execution reaches a breakpoint, at which point decision 650 branches to "Yes" branch 658 whereupon processing stores breakpoint data that corresponds to the breakpoint in breakpoint data store 170. The breakpoint data may include a calling object name, a called object name, a method name, method parameters, and a method return value.

Processing continues to monitor the source code execution and store breakpoint data when it reaches breakpoints until the source code execution completes, at which point processing returns at 640.

FIG. 7 is a flowchart showing steps taken in formatting breakpoint data for use in the generation of an interaction diagram. A diagram generation manager collected breakpoint data corresponding to breakpoint locations during source code execution. The diagram generation manager stored the breakpoint data in a standard format, such as a table.

Processing commences at 700, whereupon processing retrieves diagram properties settings from temporary store 160. The user selected a diagram type and default/customized breakpoint attributes using a diagram properties window and a customized breakpoint attributes window (see FIGS. 2A, 2B, and corresponding text for further details regarding diagram type and breakpoint attribute selections).

A determination is made as to whether user 100 wishes to change the diagram type and/or breakpoint attributes (decision 710). If user 100 wishes to changes the diagram type and/or the breakpoint attributes, decision 710 branches to "Yes" branch 712 whereupon processing receives the changes from user 100 and stores the changes in temporary store 160 (step 715). On the other hand, if user 100 does not wish to modify the diagram type or breakpoint attributes, decision 710 branches to "No" branch 718 bypassing diagram property modification steps. User 100 and temporary store 160 are the same as that shown in FIG. 1.

Processing resets a sequence counter at step 720. The sequence counter is used to track the sequence at which breakpoints occur during source code execution in order properly draw an interaction diagram. At step 725, processing retrieves breakpoint data from breakpoint data store 170 that corresponds to the first breakpoint.

A determination is made as to whether default breakpoint attributes or customized breakpoint attributes are associated with the corresponding breakpoint (decision 730). For example, user 100 may configure default breakpoint attributes to include a method name for a breakpoint, and configure customized breakpoint attributes for particular breakpoints to also include the method parameters. If custom attributes are associated with the corresponding breakpoint, decision 730 branches to "Yes" branch 738 whereupon processing selects breakpoint data that corresponds to the custom attributes. Using the example described above, processing selects the method name and the method parameters from the breakpoint data as well as other standard data, such as the calling object name and the called object name.

On the other hand, if default attributes are associated with the corresponding breakpoint, decision 730 branches to "No" branch 732 whereupon processing selects breakpoint data based upon the default attributes. Using the example described above, processing selects the method name from the breakpoint data as well as other standard data, such as the calling object name and the called object name.

Processing formats the selected breakpoint data and stores the formatted data corresponding to the sequence counter in diagram store 180 at step 760. A determination is made as to whether there is more breakpoint data included in breakpoint data store 170 to format (decision 770). If there is more breakpoint data to format, decision 770 branches to "Yes" branch 772 which loops back to increment the sequence counter (step 785), retrieve (step 790) and processes the next breakpoint data. This looping continues until there is no more breakpoint data to format, at which point decision 770 branches to "No" branch 778 whereupon processing returns at 795.

Figure 8:
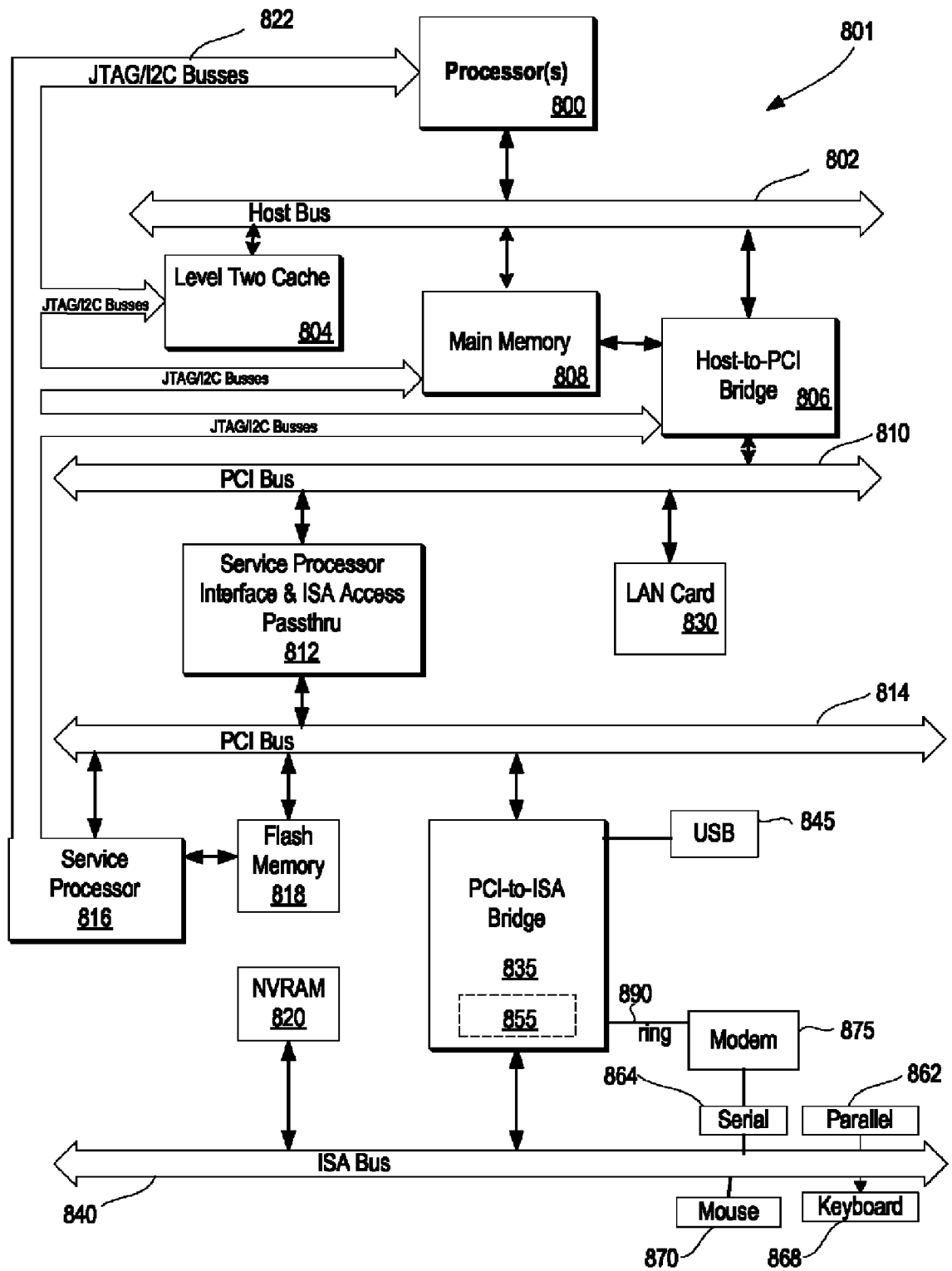
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A program product stored on a computer storage media, the computer storage media containing instructions for execution by a computer, which, when executed by the computer, cause the computer to implement a method for automated interaction diagram generation using source code breakpoints, the method comprising:

loading source code into an integrated development environment;
receiving a plurality of breakpoints using the integrated development environment that corresponds to a plurality of locations within the source code;
executing the source code;
determining that one of the plurality of breakpoints is reached during the code execution;
collecting one of a plurality of breakpoint data in response to the determining; and
generating an interaction diagram using the plurality of breakpoint data, wherein, for each individual one of the plurality of breakpoints, the generating comprises:
selecting one of the plurality of breakpoints;
determining whether the selected breakpoint has custom attributes;
in response to determining that the selected breakpoint has custom attributes, providing the custom attributes on the interaction diagram for the selected breakpoint; and
in response to determining that the selected breakpoint does not have custom attributes, providing default attributes on the interaction diagram for the selected breakpoint.

2. The program product of claim 1 wherein the method further comprises:
storing one of the plurality of breakpoint data during the code execution that corresponds to the reached breakpoint in response to the determination.

3. The program product of claim 1 wherein the method further comprises:
receiving changes to the plurality of breakpoints, the changes resulting in a changed plurality of breakpoints;
collecting a plurality of changed breakpoint data based upon the changed plurality of breakpoints; and
generating a subsequent interaction diagram using the plurality of changed breakpoint data.

4. The program product of claim 1 wherein the breakpoint data is a method return value.

5. The program product of claim 1 wherein the interaction diagram is selected from the group consisting of a sequence diagram and a collaboration diagram.

6. An information handling system comprising:
one or more processors;
a memory accessible by the processors;
one or more nonvolatile storage devices accessible by the processors; and
a diagram generation tool for generating interaction diagrams, the diagram generation tool being effective to:
load source code into an integrated development environment;
receive a plurality of breakpoints using the integrated development environment that corresponds to a plurality of locations within the source code;
execute the source code using one of the processors;
determine that one of the plurality of breakpoints is reached during the code execution;
collect one of a plurality of breakpoint data in response to the determining; and
generate an interaction diagram using the plurality of breakpoint data, wherein, for each individual one of the plurality of breakpoints, the generating is effective to:
select one of the plurality of breakpoints;
determine whether the selected breakpoint has custom attributes;
in response to determining that the selected breakpoint has custom attributes, provide the custom attributes on the interaction diagram for the selected breakpoint; and
in response to determining that the selected breakpoint does not have custom attributes, provide default attributes on the interaction diagram for the selected breakpoint.

7. The information handling system of claim 6 wherein the diagram generation tool is further effective to:
store one of the plurality of breakpoint data in one of the nonvolatile storage devices during the code execution that corresponds to the reached breakpoint in response to the determination.

8. The information handling system of claim 6 wherein the diagram generation tool is further effective to:
receive changes to the plurality of breakpoints, the changes resulting in a changed plurality of breakpoints;
collect a plurality of changed breakpoint data based upon the changed plurality of breakpoints; and
generate a subsequent interaction diagram using the plurality of changed breakpoint data.

9. The information handling system of claim 6 wherein the breakpoint data is a method return value.

10. The information handling system of claim 6 wherein the interaction diagram is selected from the group consisting of a sequence diagram and a collaboration diagram.

11. A program product stored on a computer storage media, the computer storage media containing instructions for execution by a computer, which, when executed by the computer, cause the computer to implement a method for automated interaction diagram generation using source code breakpoints, the method comprising:
loading source code into an integrated development environment;
receiving a plurality of breakpoints using the integrated development environment that corresponds to a plurality of locations within the source code;
executing the source code;
determining that one of the plurality of breakpoints is reached during the code execution;
collecting one of a plurality of breakpoint data in response to the determining, wherein the breakpoint data is selected from the group consisting of a calling object name, a called object name, a method name, a method parameter, and a method return value; and
generating an interaction diagram using the one of the plurality of breakpoint data, wherein the interaction diagram is selected from the group consisting of a sequence diagram and a collaboration diagram, wherein, for each individual one of the plurality of breakpoints, the generating comprises:
selecting one of the plurality of breakpoints;
determining whether the selected breakpoint has custom attributes;
in response to determining that the selected breakpoint has custom attributes, providing the custom attributes on the interaction diagram for the selected breakpoint; and
in response to determining that the selected breakpoint does not have custom attributes, providing default attributes on the interaction diagram for the selected breakpoint.

* * * * *